(12) United States Patent
Gupta et al.

(10) Patent No.: US 7,878,883 B2
(45) Date of Patent: Feb. 1, 2011

(54) WIRE SAW INGOT SLICING SYSTEM AND METHOD WITH INGOT PREHEATING, WEB PREHEATING, SLURRY TEMPERATURE CONTROL AND/OR SLURRY FLOW RATE CONTROL

(75) Inventors: Puneet Gupta, St. Peters, MO (US); Milind S. Kulkarni, St. Louis, MO (US); Carlo Zavattari, Novara (IT); Roland R. Vandamme, Wentzville, MO (US)

(73) Assignee: MEMC Electronics Materials, Inc., St. Peters, MO (US)

( * ) Notice: Subject to any disclaimer, the term of this patent is extended or adjusted under 35 U.S.C. 154(b) by 985 days.

(21) Appl. No.: 11/621,920

(22) Filed: Jan. 10, 2007

(65) Prior Publication Data

US 2007/0178807 A1 Aug. 2, 2007

Related U.S. Application Data

(60) Provisional application No. 60/762,296, filed on Jan. 26, 2006.

(51) Int. Cl.
*B24B 49/00* (2006.01)
*B28D 1/08* (2006.01)
(52) U.S. Cl. .............. 451/7; 451/53; 451/60; 451/304; 125/16.02; 125/21

(58) Field of Classification Search ............ 451/7, 451/11, 36, 41, 53, 60, 304; 125/16.01, 16.02, 125/21
See application file for complete search history.

(56) References Cited

U.S. PATENT DOCUMENTS

| 6,006,738 A | 12/1999 | Itoh et al. |
| 6,408,840 B2 * | 6/2002 | Ishida .................. 125/21 |
| 6,941,940 B1 | 9/2005 | Zavattari et al. |
| 7,306,508 B2 * | 12/2007 | Kawasaki et al. ............ 451/7 |
| 2001/0018913 A1 * | 9/2001 | Ishida .................. 125/21 |
| 2002/0174861 A1 * | 11/2002 | Lundt et al. .............. 125/21 |
| 2004/0084042 A1 * | 5/2004 | McAulay et al. ............ 125/21 |
| 2006/0249134 A1 * | 11/2006 | Kawasaki et al. ............ 125/21 |

FOREIGN PATENT DOCUMENTS

| EP | 0549893 A1 | 7/1993 |
| EP | 1097782 A1 | 5/2001 |
| JP | 10180750 A * | 7/1998 |

* cited by examiner

*Primary Examiner*—Eileen P. Morgan
(74) *Attorney, Agent, or Firm*—Armstrong Teasdale LLP

(57) ABSTRACT

A system and method for slicing an ingot into wafers using the wire saw process. A slurry collection system collects and supplies slurry to a slurry handling system for controlling temperatures and/or flow rates of the slurry thereby providing slurry output at a controlled temperature and/or a controlled flow rate to slicing system for cutting the ingot, which may be preheated.

17 Claims, 15 Drawing Sheets

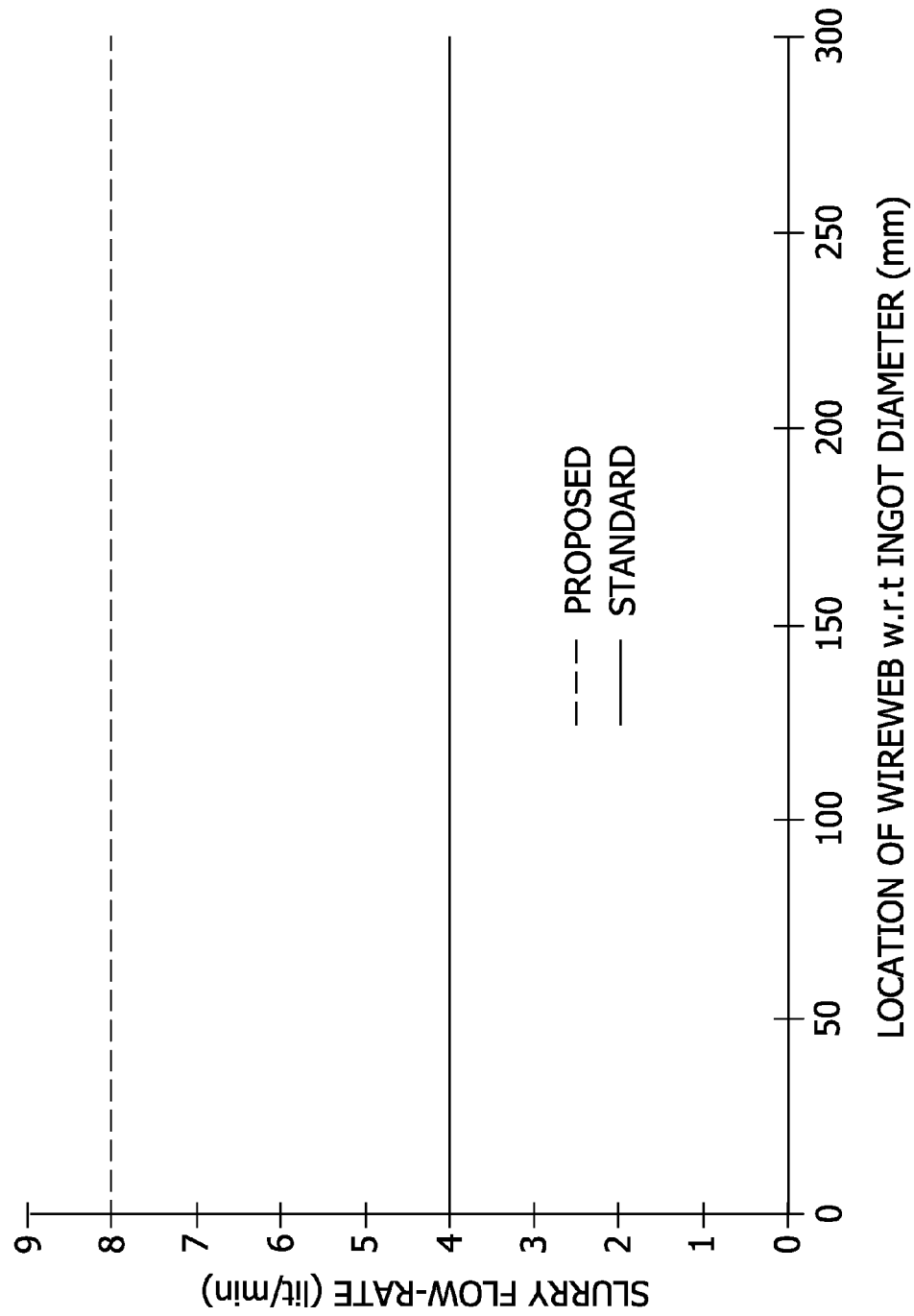

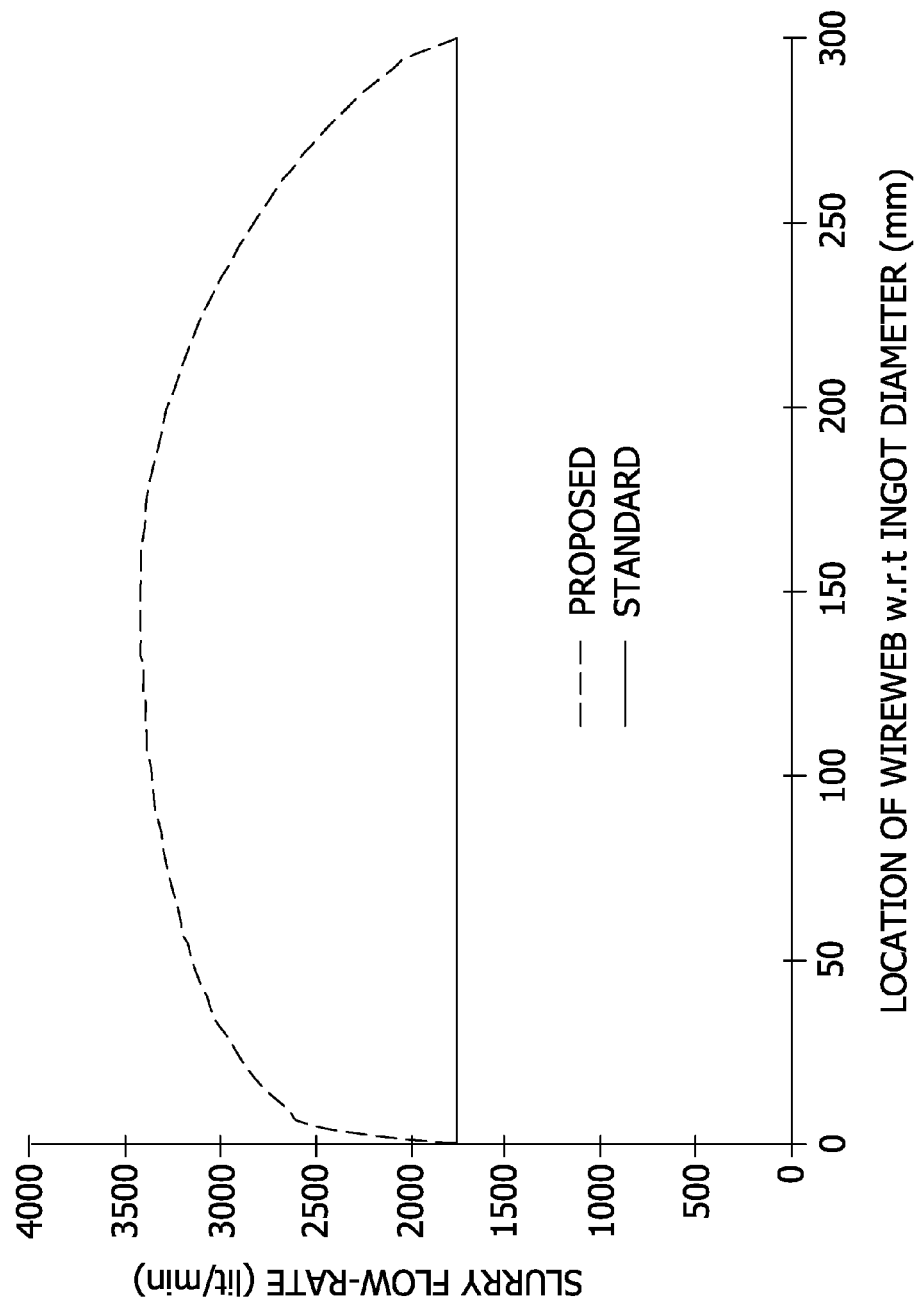

WIRE SAW INGOT SLICING SYSTEM AND METHOD WITH INGOT PREHEATING, WEB PREHEATING, SLURRY TEMPERATURE CONTROL AND/OR SLURRY FLOW RATE CONTROL

BACKGROUND OF THE INVENTION

The present invention generally relates to a system and method for controlling slurry used for wire saw ingot slicing. In particular, the invention relates to a slurry handling system and method for controlling temperature and flow rate of the slurry and for preheating the ingot and web.

Semiconductor wafers are generally prepared from a single monocrystalline semiconductor ingot, such as a silicon ingot having a cylindrical shape. The ingot is sliced in a direction normal to its longitudinal axis to produce as many as several hundred thin, disk-shaped wafers. The slicing operation may be accomplished by means of a single or multiple wire saw, wherein the ingot is contacted with a reciprocating wire while a liquid slurry containing abrasive grains is supplied to a contact area between the ingot and the wire. As the abrasive particles in the slurry are rubbed by the wire against the ingot, silicon crystal is removed and the ingot is gradually sliced. The wire saw provides a gentle mechanical method for slicing which makes it ideal for cutting silicon crystal, which is brittle and could be damaged by other types of saws (e.g., conventional internal diameter saws). After slicing, each wafer is subjected to a number of processing operations to reduce the thickness, remove damage caused by the slicing operation, and create a flat and highly reflective surface suitable for fabrication of integrated circuit devices.

Wire saws generally have two, three or four rollers which are rotatably mounted on a frame, each roller having guide grooves for receiving segments of wire. Multiple parallel lengths of the wire extend between two of the rollers to form a wire web for slicing the ingot into multiple wafers. The space between adjacent wires in the web generally corresponds to the thickness of one wafer before processing. The apparatus includes an ingot support that may mount one or more silicon ingots and is adjustable to accurately align an orientation of the crystalline structure of the ingot relative to a cutting plane. The support is moveable in translation to bring the ingot into contact with the wire web.

Slurry is transported from a nearby slurry container to the wire by a pump, tubing, and at least one nozzle which dispenses slurry onto the wire web. A portion of the slurry then moves with the wire into a contact area between the wire and the ingot where the silicon crystal is cut. Typically, there are two nozzles positioned on opposite sides of the ingot holder so that slurry is dispensed onto the web on both sides of the ingot, thus facilitating delivery of slurry to the cutting region for either direction of travel of the reciprocating wire. Each nozzle is positioned above the wire web at close spacing and configured to dispense slurry in a generally thin, linear and homogeneous distribution pattern, forming a curtain or sheet of slurry. The slurry curtain extends across a full width of the wire web so that slurry is delivered to every reach of wire and every slice in the ingot.

A substantial concern when slicing semiconductor ingots is maintaining flatness of the wafers that are cut by the wire saw. One key to avoiding thickness variation and warp on wafer surfaces is controlling build up of frictional heat at the contact area, or cutting region. Accordingly, the liquid slurry is actively cooled prior to dispensing on the wire web so that it may remove heat as it passes through the cutting region. For cooling the slurry, a heat exchanger is typically located between the slurry-collection container and the slurry delivery nozzle.

A limitation to the process of slicing semiconductor ingots is that it requires a substantial amount of time and can become a hindrance to the efficient production of wafers. It is desirable to slice the ingots as quickly as possible to improve throughput and reduce costs, yet there have been difficulties implementing a more rapid wire sawing process. The speed of the cutting wire cannot be substantially increased because that would elevate temperature at the cutting region to the detriment of the flatness of the wafers and their surface finishing. In addition, high wire-speeds relative to the ingot increase the possibility of wire breakage that is detrimental to the process outcome.

The use of multi-wire saw process for slicing large work pieces (200 mm and greater in diameter) has emerged as one technology of choice for meeting the requirements of both the semiconductor as well as the photovoltaic industries. Primary growth drivers of the technology have been its abilities not only to process multiple slices simultaneously but also to be able to slice small thicknesses with minimal kerf loss. The slicing technology in its currently practiced industrial form is based on employing the cutting action of free floating slurry particles in a process fluid (mineral-oil/glycol). This slurry is introduced on a web of wires which carry it into the ingot cutting zone by a periodic reciprocating motion of the wires. The ingot to be sliced is pressed against this reciprocating web of wires and is progressively sliced by the cutting action of the slurry particles by a rolling, indenting, cutting, scratching mechanism.

Unfortunately, the slicing technology in its industrially practiced form has been arrived at mostly through empirical means, and little is reported/understood about the fundamental mechanisms that lead to the surface features observed on the as-cut wafers. Therefore, with the requirements for better surface finish getting tighter by the day, it is becoming increasingly difficult to produce wafers with ever decreasing warp without controlling the process based on more fundamental understanding. Hence, producing as-cut wafers with reduced warp while lowering the total cycle time is critical to minimize the cost of ownership of the wire saw process, in addition to producing wafers with higher surface quality.

FIG. 1 illustrates one related art system such as may be used with a wire saw and process for slicing multiple semiconductor ingots as disclosed in U.S. Pat. No. 6,941,940, the entire disclosure of which is incorporated herein by reference. A slurry cooling system 102 receives recycled slurry from a slurry collection system 104. The recycled slurry is cooled by system 102 and supplied via a valve 106 to a wire web port 108 of a wire saw process 110 for slicing ingots. The recycled slurry cooled by system 102 is also supplied via a valve 112 to an ingot holder port 114 of a wire saw process 110 for slicing ingots. Slurry supplied to the wire web port is applied to the wire web during the wire saw cutting of an ingot and slurry supplied to the ingot holder port is applied to the ingot holder during the wire saw cutting of the ingot. Thereafter, the applied slurry absorbs heat during wire saw cutting and the heated slurry is collected by the slurry collection system 104, which provides the heated slurry to the slurry cooling system 102 for cooling and recycling.

FIG. 2 is an exemplary illustration of a simulated two-dimensional wafer shape with respect to a best-fit reference plane from the related art process of FIG. 1 for a wafer cut by saw wire from the end of an ingot, where warp tends to be greater. The darker area centered about y=150 indicates a substantially flat area with respect to a "best-fit" reference plane. The darker areas at the edges about y=0 and y=300 indicate an area which is about 15 μm below the "best-fit" reference plane. FIG. 3 is an exemplary illustration of a simulated one-dimensional wafer shape profile with respect to a best-fit reference plane from the related art process of FIG. 1 for a wafer cut by saw wire from the end of an ingot, where warp tends to be greater. The vertical axis indicates a range of −20 μm below the "best-fit" reference plane to 10 μm above the "best-fit" reference plane.

SUMMARY OF THE INVENTION

This invention relates to the warp-improvement of as-cut wafers produced from slicing of single crystal ingots using the multi-wire saw process. Warp in as-cut wafers is predominantly produced by the non-uniform differential thermal expansion of the ingot during the slicing cycle by the heat generated from the cutting action. Therefore, by controlling the slurry flow-rates over the wire-web as well as through the channel in the ingot holder, and/or by controlling the temperature of the incoming slurry, and/or by controlling the temperature of the ingot (e.g., preheating the ingot) the non-uniformity in the differential expansion of the ingot is effectively managed to produce wafers with reduced warp.

Other objects and features will be in part apparent and in part pointed out hereinafter.

BRIEF DESCRIPTION OF THE DRAWINGS

FIG. 7A presents an illustration comparing a standard slurry flow rate through the channel in the ingot-holder and a proposed slurry flow rate through the channel in the ingot-holder according to the invention. The proposed rate is an alternative rate according to the invention and has been labeled as proposed to distinguish it over the standard rate, which is also according to one embodiment of the invention.

FIG. 7B presents an illustration comparing a standard slurry flow rate to the wire-web and a proposed slurry flow rate to the wire-web according to the invention. The proposed rate is an alternative rate according to the invention and has been labeled as proposed to distinguish it over the standard rate, which is also according to one embodiment of the invention.

Corresponding reference characters indicate corresponding parts throughout the drawings.

DETAILED DESCRIPTION

The following presents the description of the multi-wire saw process improvements for producing 300 mm as-cut wafers with reduced warp with results applicable to slicing of ingots of any size.

Slurry Temperature and/or Flow Control

Figure 4:
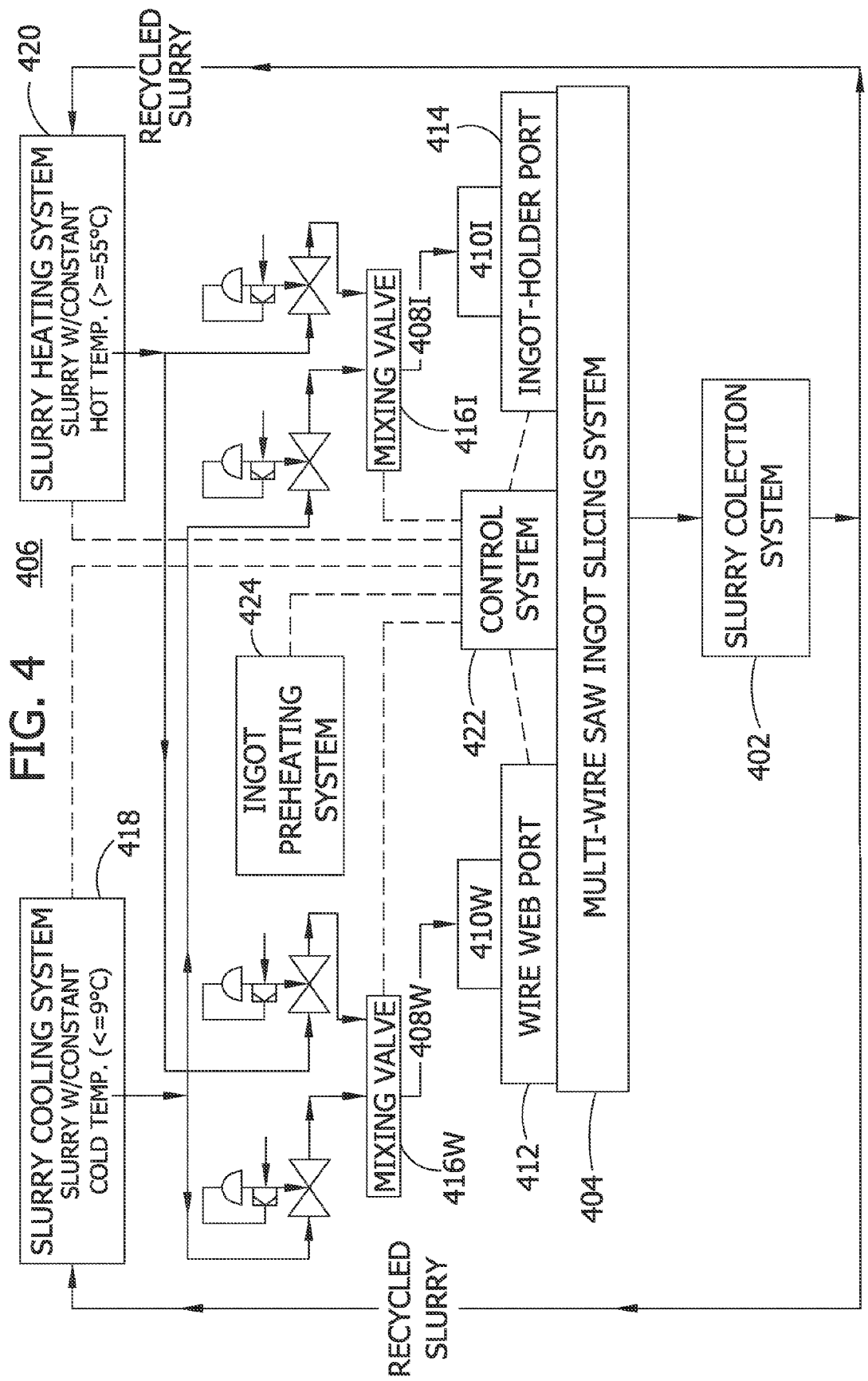
FIG. 4 is a block diagram illustrating one embodiment of a system according to the invention.

Referring to FIG. 4, a system for cutting an ingot (or multiple ingots) is illustrated in block diagram form. A slurry collection system 402 collects and supplies the slurry to be applied to a multi-wire saw ingot slicing system 404 such as illustrated and disclosed in U.S. Pat. No. 6,941,940. A slurry handling system 406 is connected to the slurry collection system 402 for controlling temperature and flow rate of the slurry applied to the slicing system 404. The slurry handling system 406 has at least one slurry output port 408 providing slurry output at a controlled temperature and/or a controlled flow rate to the slicing system 404. The slicing system 404 for cutting the ingot has a port 410 for receiving the slurry from the slurry output port 408 of the slurry handling system 406, and the slurry is applied/delivered to the wire-web and/or ingot-holder.

In one embodiment, the slicing system 404 includes a wire web port 412 for applying slurry to the cutting wire(s) and an ingot-holder port 414 for applying slurry to the ingot-holder (e.g., through a channel in the ingot holder) or both the ingot-holder and the wire(s). Either or both ports 412 and 414 receive slurry at a controlled temperature and/or at a controlled flow rate provided by a mixing valve 416 which receives cooled, recycled slurry from a slurry cooling system 418 and heated, recycled slurry from a slurry heating system 420. A control system 422, which may be a mechanical control, an electrical control or an electro-mechanical control, may be employed to control the temperature and/or the flow rate being provided to the ports 412, 414. In one embodiment, the slurry cooling system 418 and the slurry heating system 420 are used in combination so that mixing valves 416I and 416W are able to respond quickly to mix and provide slurry temperatures in accordance with and responsive to the control system 422. For example, control system 422 may be a processor which controls the mixing valves 416. Alternatively or in addition, the control system 422 may control the cooling system 418 and/or the heating system 420. Alternatively or in addition, the control system 422 may control a flow valve (not shown) which is supplying slurry to either or both ports 412 and 414. Alternatively, the control system 422 may be a processor which receives input from an operator specifying a desired controlled temperature and a desired controlled flow rate or pressure.

It is also contemplated that the control system 422 may receive feedback from the slurry handling system 406. For example, temperature, pressure and/or flow sensors may be positioned at or near any one or more of the following: cooling system 418, heating system 420, mixing valve 416, output ports 408, ports 412 and 414, slicing system 404. Such sensors would provide information or feedback to the controller 422 which would be used by the controller 422 to adjust one or more parameters of the slurry handling system 406. As a non-limiting example, temperature sensors can provide information of the slurry temperature at various stages of slurry handling to assist the control system 422 in controlling the cooling system 418, the heating system 420 and/or the mixing valves 416. As another non-limiting example, flow sensors can provide information of the slurry flow rate at various stages to assist the control system 422 in controlling the mixing valves 416, flow valves (not shown) or system pressure. Those skilled in the art will recognize that the control system 422 may control other aspects of the system illustrated in FIG. 4, such as the slicing system 404 and/or the slurry collection system 402 or any other valves, pumps or pressure, temperature or flow related devices.

Figure 1:
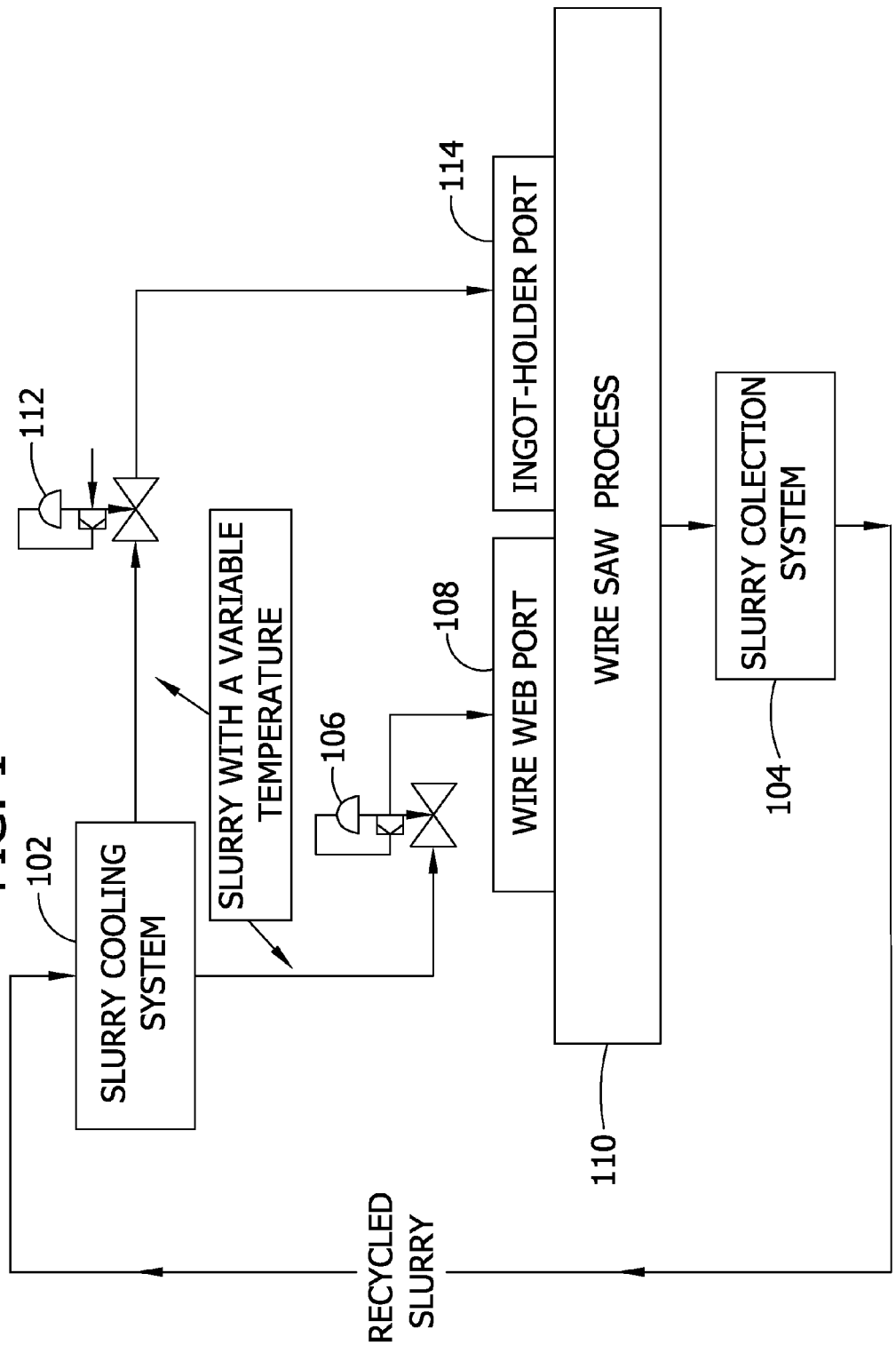
FIG. 1 is a block diagram illustrating a related art system.
Figure 2:
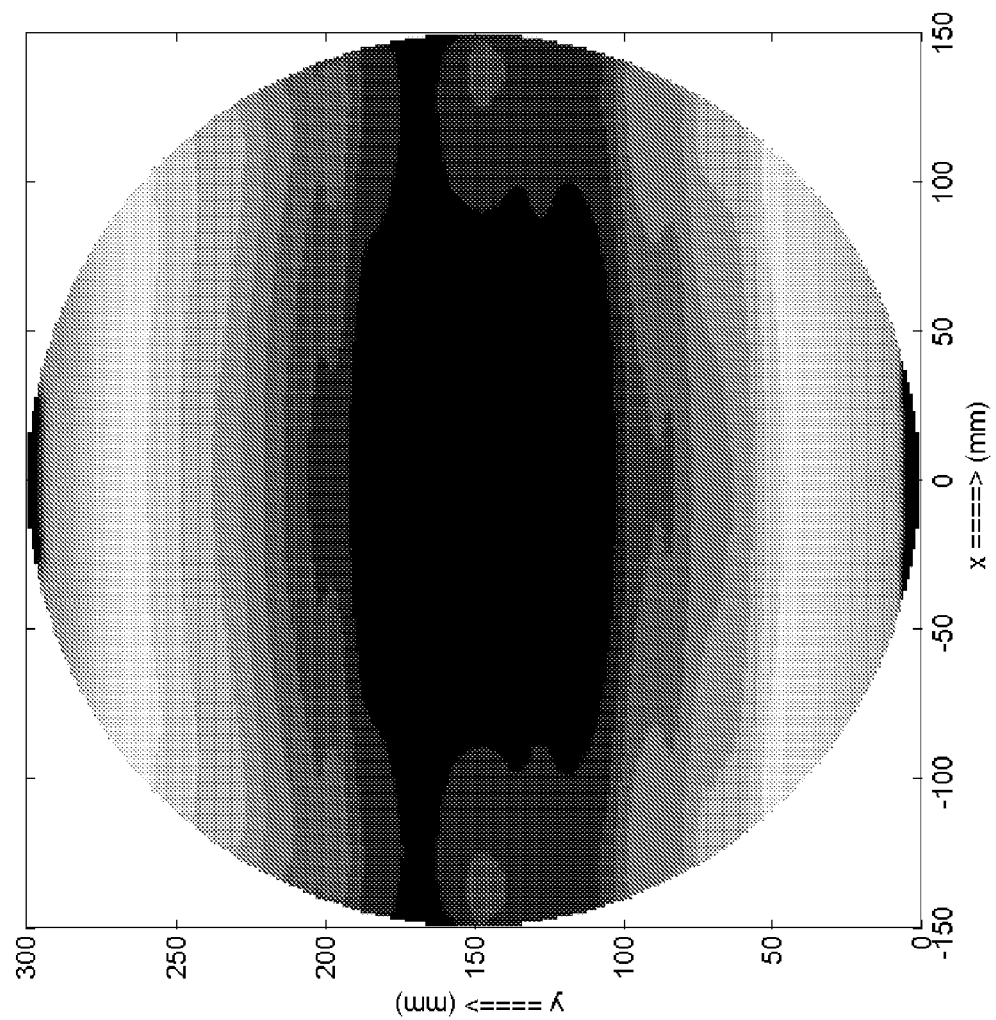
FIGS. 2 and 3 show the simulated wafer-shape with respect to best-fit reference plane from the related art process of FIG. 1 for a wafer from the end of the ingot where the warp is the worst.
Figure 3:
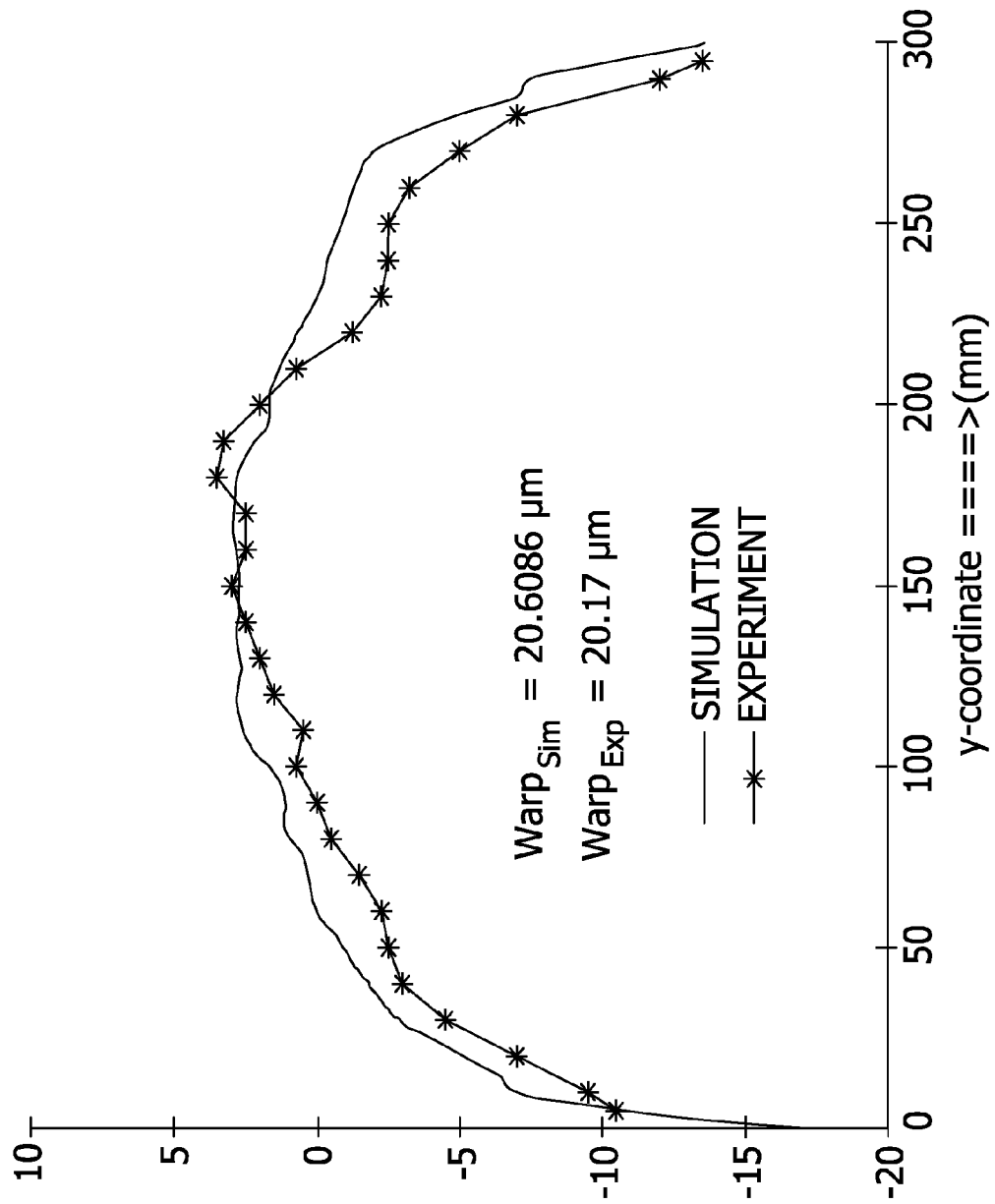
Figure 5:
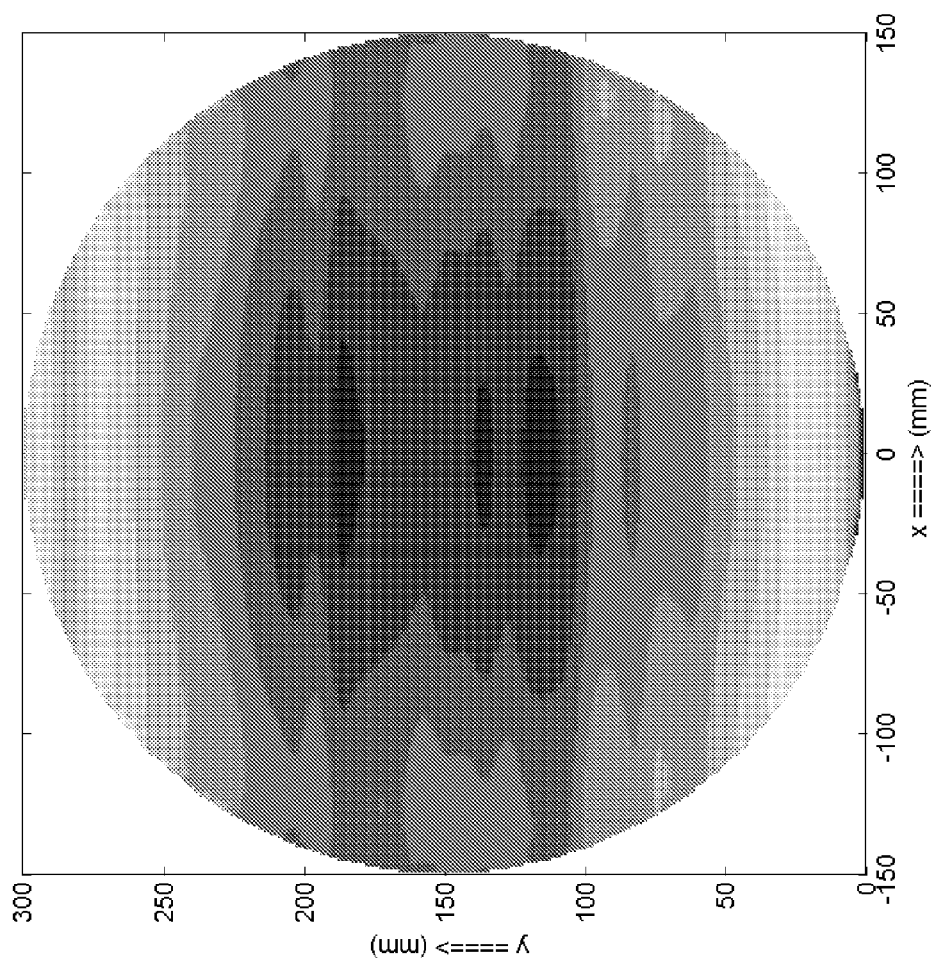
FIG. 5 is an exemplary illustration of a simulated two-dimensional wafer shape with respect to a best-fit reference plane from the process of FIG. 4 according to the invention for a wafer cut by saw wire from the end of an ingot, where warp tends to be greater.
Figure 6:
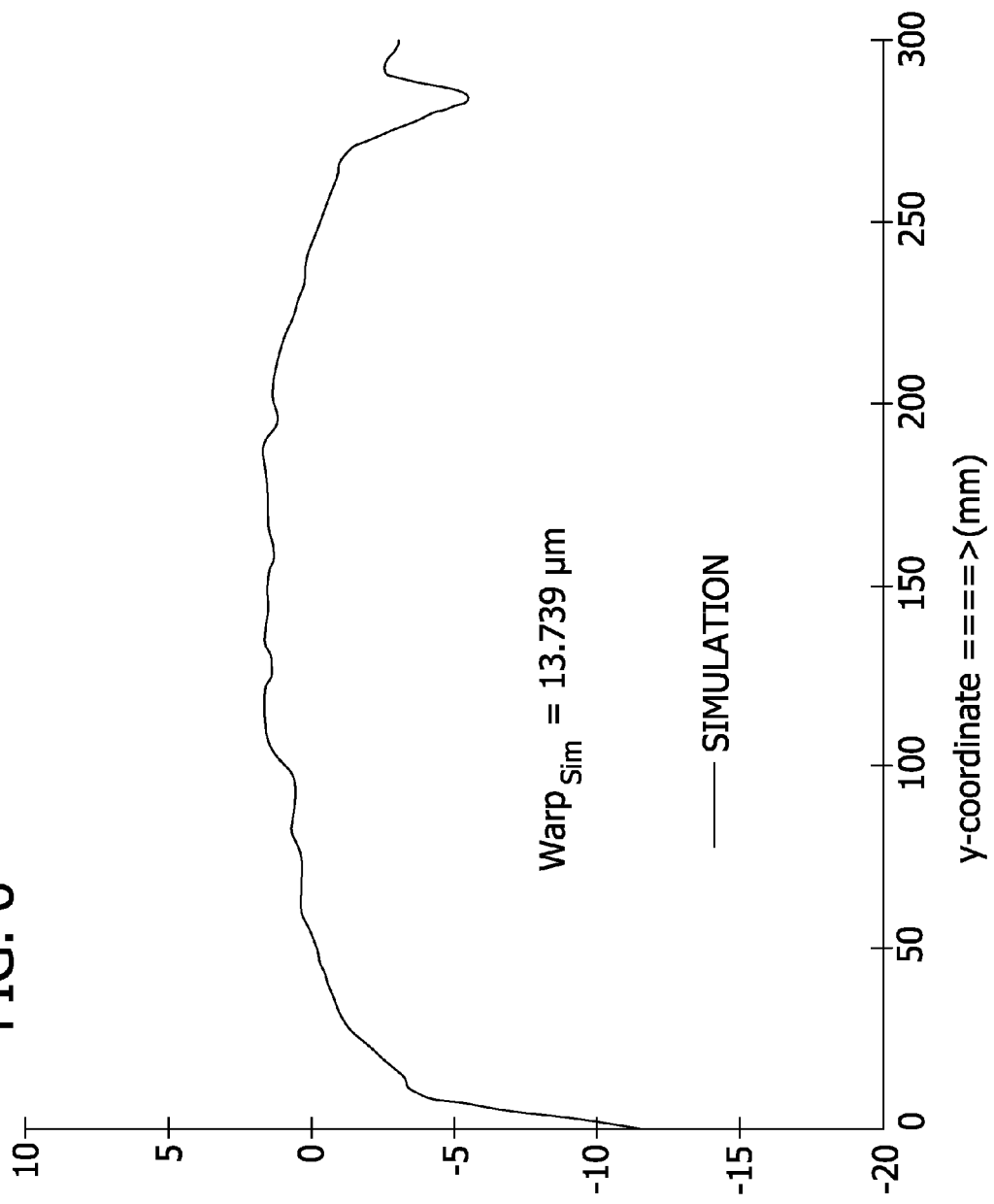
FIG. 6 is an exemplary illustration of a simulated one-dimensional wafer shape profile with respect to a best-fit reference plane from the process of FIG. 4 according to the invention for a wafer cut by saw wire from the end of an ingot, where warp tends to be greater.

FIGS. 5 and 6 show the wafer-shape with respect to best-fit reference plane for the process of FIG. 4, according to the invention, simulated through Finite-Element modeling. As can be seen from the comparison of the simulated warp (Warp$_{Sim}$) shown in FIG. 3 for the related art process of FIG. 1 and simulated warp (Warp$_{Sim}$) shown in FIG. 6 for the process of FIG. 4 according to the invention, a warp improvement of about 34% is achieved by the process of FIG. 4 according to one embodiment of the invention. In FIG. 5, the darker area centered about y=150 indicates a substantially flat area with respect to a "best-fit" reference plane. The lighter areas toward the edges about y=0 and y=300 indicate an area which is about 5 μm to 10 μm below the "best-fit" reference plane. The vertical axis indicates a range of −20 μm below the "best-fit" reference plane to 10 μm above the "best-fit" reference plane.

FIG. 7A presents an illustration comparing a standard slurry flow rate through the channel in the ingot-holder and a proposed slurry flow rate through the channel in the ingot-holder according to the invention. The solid line represents the standard rate and the dashed line represents the proposed rate.

FIG. 7B presents an illustration comparing a standard slurry flow rate delivered to the wire-web and a proposed slurry flow rate delivered to the wire-web according to the invention. The solid line represents the standard rate and the dashed line represents the proposed rate.

Figure 7C:
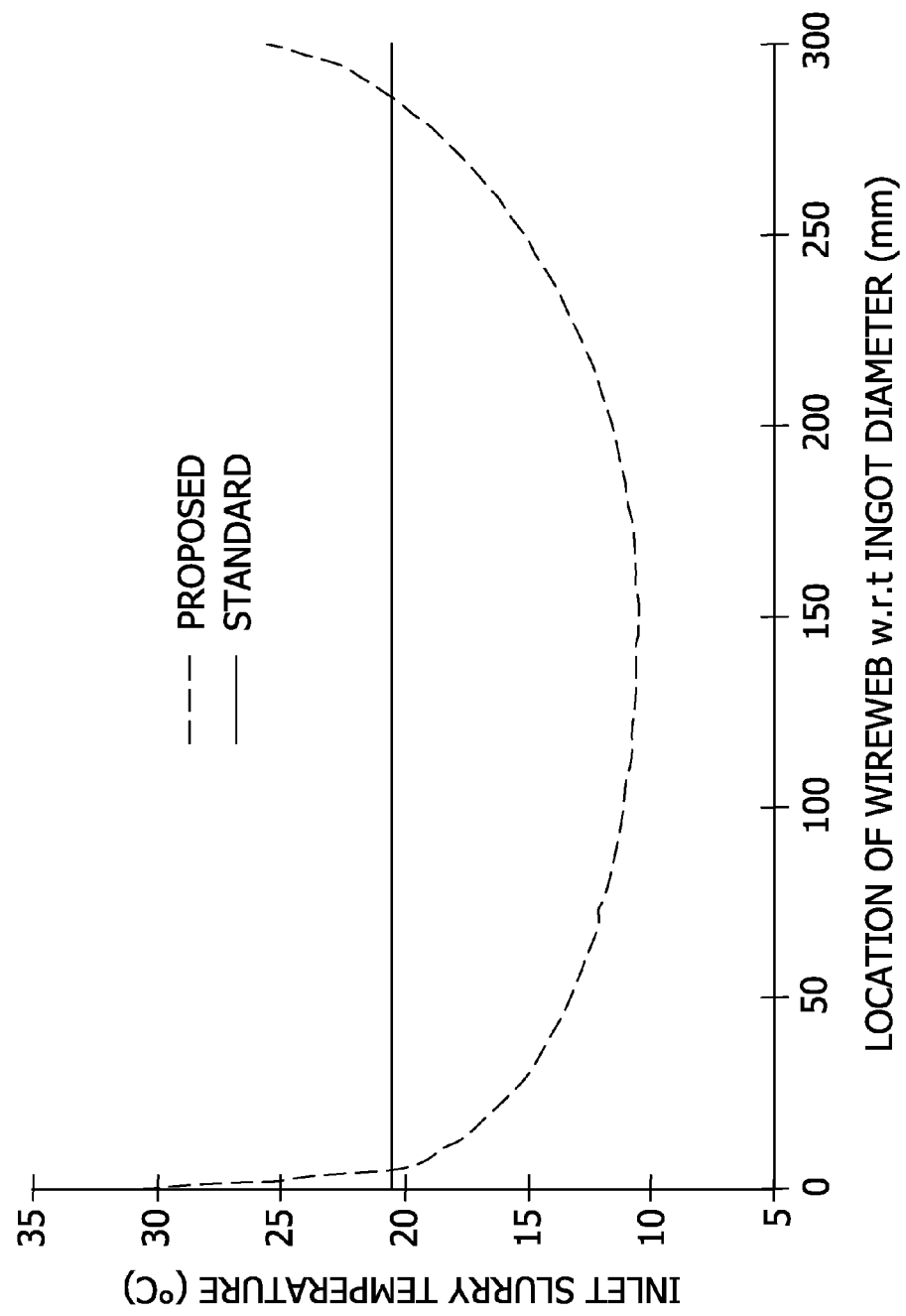
FIG. 7C presents an illustration comparing a standard slurry inlet temperature through the channel in the ingot-holder as well as to the wire-web and a proposed slurry inlet temperature through the channel in the ingot-holder as well as to the wire-web according to the invention. The proposed temperature is an alternative temperature according to the invention and has been labeled as proposed to distinguish it over the standard temperature, which is also according to one embodiment of the invention.

FIG. 7C presents an illustration comparing a standard slurry inlet temperature through the channel in the ingot-holder as well as to the wire-web and a proposed slurry inlet temperature through the channel in the ingot-holder as well as to the wire-web according to the invention. The solid line represents the standard rate and the dashed line represents the proposed rate.

FIGS. 7A-7C present the details of the process changes that were implemented to arrive at the improved warp in as-cut wafers according to one embodiment of the invention. The figures also show equivalent process conditions for a standard process. In one preferred embodiment, the proposed process changes to reduce warp include a combination of one or more of the following:

1. An increase over the previous value in the channel slurry flow-rate from 3 liters/minute to 6 liters/minute through the ingot-holder channel port 414. In general, in one embodiment, the flow rate should be at least 4 liters/minute. In certain embodiments, this has been shown to result in about a 25% increase in the heat transfer coefficient for heat flow from the ingot to the channel slurry (as shown in FIG. 7A). Thus, warp may be reduced or controlled.

A profiled increase in the slurry flow-rate over the wire-web channel port 412 to cause a 0-25% increase in the heat transfer coefficient for heat flow from the ingot to the wire-web slurry (as shown in FIG. 7B). In general, the slurry flow rate may be varied in direct proportion to the relative location of the wire web with respect to the ingot and particularly the ingot diameter for cylindrical ingots. For example, when cutting a cylindrical ingot, the slurry flow rate would increase as the wire penetrates the cylinder and the diameter of the cut increases. When the wire reaches the center of the cylinder the slurry flow rate would be at a maximum and would thereafter decrease as the wire continues to cut through the cylinder and the diameter of the cut decreases.

3. A controlled slurry temperature profile for inlet 410 as shown in FIG. 7C. In general, the slurry temperature may be varied in inverse proportion to the relative location of the wire web with respect to the ingot diameter. For example, when cutting a cylindrical ingot, the slurry temperature would decrease as the wire penetrates the cylinder and the diameter of the cut increases. When the wire reaches the center of the cylinder the slurry temperature would be at a minimum and would thereafter increase as the wire continues to cut through the cylinder and the diameter of the cut decreases.

Ingot Preheating

As illustrated in FIG. 4, one embodiment of the invention includes an ingot preheating system 424 for preheating the ingot before cutting and, optionally, for maintaining ingot temperature during cutting. In general, the ingot preheating system 424 may be used independent of any slurry temperature control and independent of any slurry flow control. Thus, the following embodiments of the invention are contemplated: slurry temperature control only, slurry flow control only, ingot preheating only, ingot temperature control during cutting only and any combination of two or more of slurry temperature control, slurry flow control, ingot preheating and ingot temperature control during cutting. In one embodiment, the ingot is preheated to approximately 55° C. and the reciprocating wire-web is preheated by supplying to the web a slurry of 65° C. for a period of about 30-35 minutes before the actual cutting starts.

Figure 8A:
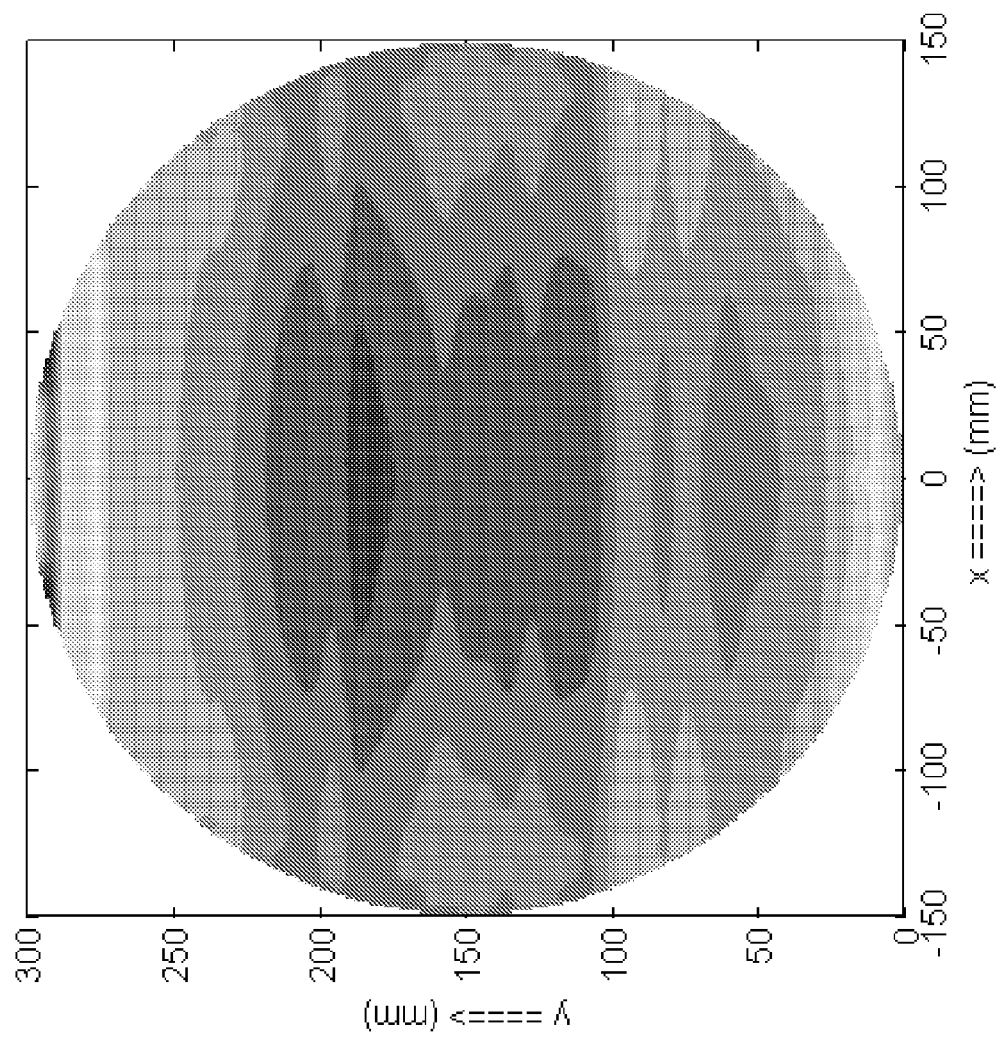
FIG. 8A is an exemplary illustration of a simulated two-dimensional wafer shape with respect to a best-fit reference plane from the process of FIG. 4 according to the invention for a wafer cut by saw wire from the end of a ingot preheated with a substantially constant slurry flow rate and temperature.
Figure 8B:
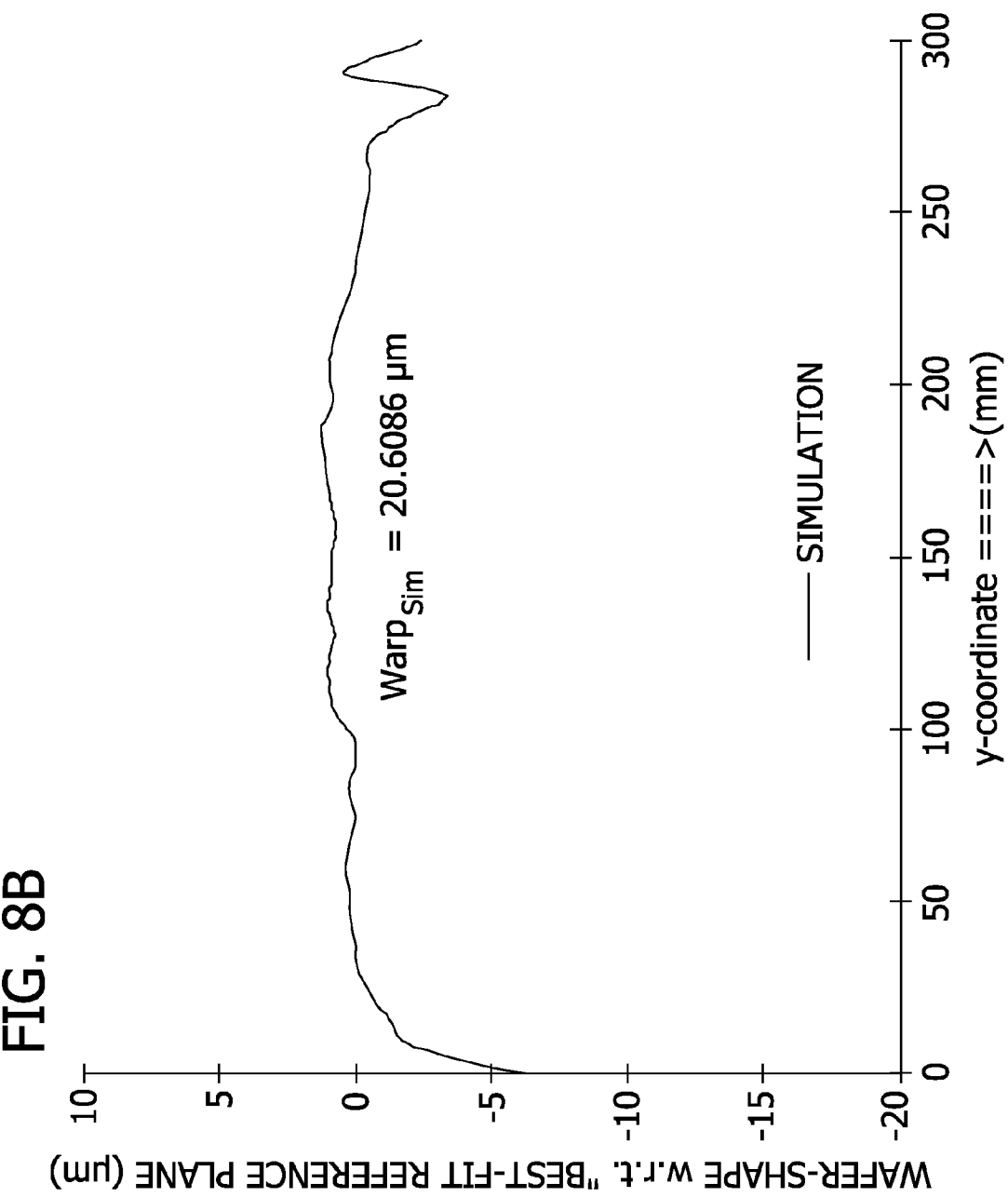
FIG. 8B is an exemplary illustration of a simulated one-dimensional wafer shape profile with respect to a best-fit reference plane from the process of FIG. 4 according to the invention for a wafer cut by saw wire from the end of a ingot preheated with a substantially constant slurry flow rate and temperature.

FIG. 8A is an exemplary illustration of a simulated two-dimensional wafer shape with respect to a best-fit reference plane from the process of FIG. 4 according to the invention for a wafer cut by saw wire from the end of a ingot preheated with a substantially constant slurry flow rate and temperature. The darker area centered about y=150 indicates a substantially flat area with respect to a "best-fit" reference plane. The lighter areas at the edges about y=0 and y=300 indicate an area which is about 5 μm below the "best-fit" reference plane. FIG. 8B is an exemplary illustration of a simulated one-dimensional wafer shape profile with respect to a best-fit reference plane from the process of FIG. 4 according to the invention for a wafer cut by saw wire from the end of a ingot preheated with a substantially constant slurry flow rate and temperature. In FIG. 8B, the vertical axis indicates a range of −20 μm below the "best-fit" reference plane to 10 μm above the "best-fit" reference plane.

As can be seen by comparing FIGS. 5 and 8A and by comparing FIGS. 6 and 8B, the warp is further reduced from 13.739 μm to 9.6727 μm.

Figure 9:
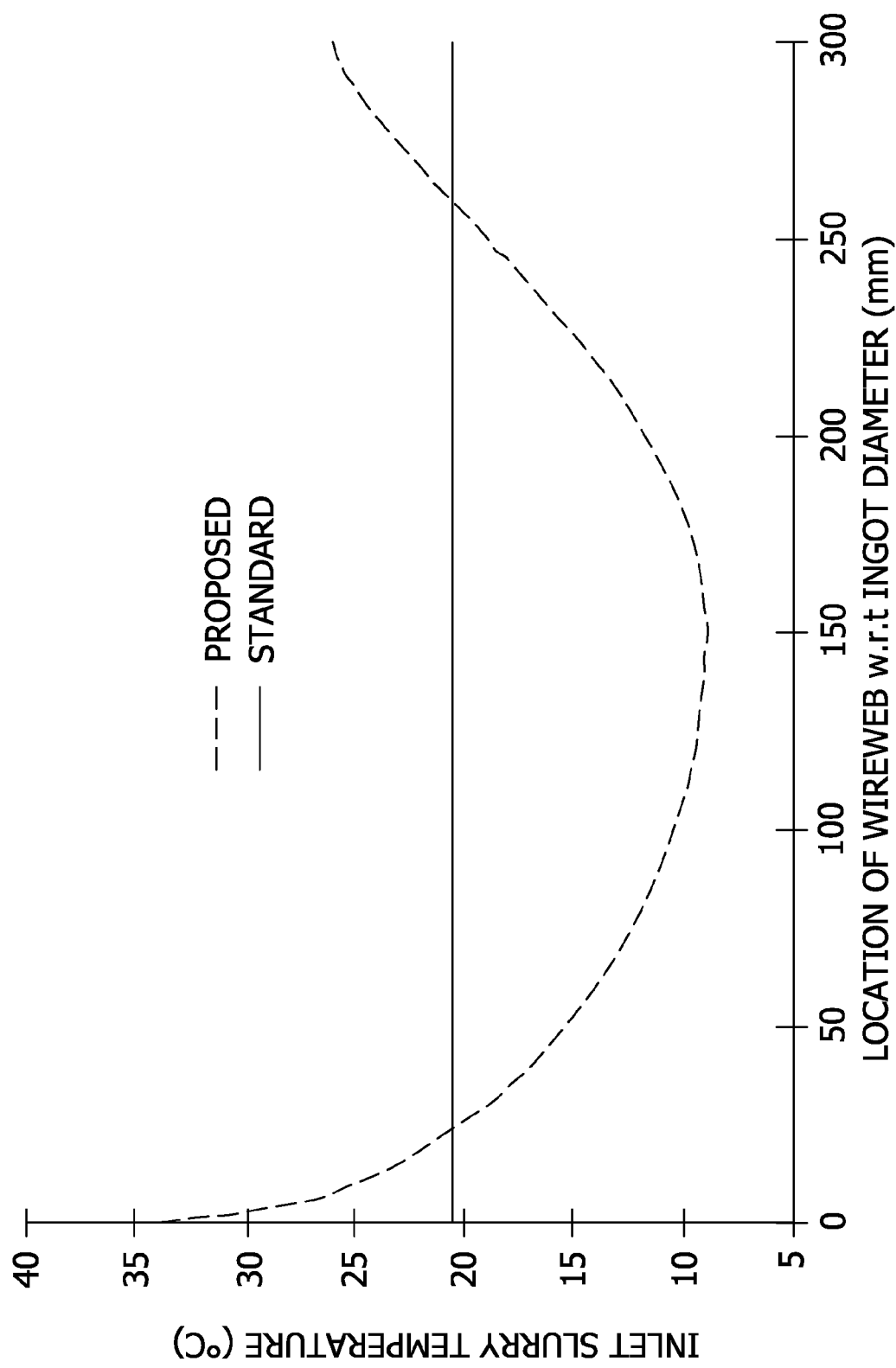
FIG. 9 presents an illustration comparing a standard slurry inlet temperature through the channel in the ingot-holder as well as to the wire-web and a proposed slurry inlet temperature through the channel in the ingot-holder as well as to the wire-web according to the invention after ingot and/or wire-web preheating as described in FIGS. 8A and 8B. The proposed temperature is an alternative temperature according to the invention and has been labeled as proposed to distinguish it over the standard temperature, which is also according to one embodiment of the invention.

FIG. 9 presents an illustration comparing a standard slurry inlet temperature through the channel in the ingot-holder as well as to the wire-web and a proposed slurry inlet temperature through the channel in the ingot-holder as well as to the wire-web according to the invention after ingot and/or web preheating as mentioned in the description of FIGS. 8A and 8B.

It is also contemplated that the control system 422 may receive feedback relating to ingot temperature. For example, temperature sensors may be positioned at or near the ingot to monitor its preheating and to monitor its temperature during the cutting operation. Such sensors would provide information or feedback to the controller 422 which would be used by the controller 422 to adjust one or more parameters of the ingot preheating system 424 and/or any other aspects of the slurry handling system 406. As a non-limiting example, ingot temperature sensors can provide information of the ingot temperature at various stages to assist the control system 422 in controlling the cooling system 418, the heating system 420 and/or the mixing valves 416. As another non-limiting example, flow sensors can provide information of the slurry flow rate at various stages to assist the control system 422 in controlling the mixing valves 416, flow valves (not shown) or system pressure in accordance with the ingot temperature. Those skilled in the art will recognize that the control system 422 may control other aspects of the system illustrated in FIG. 4, such as the slicing system 404 and/or the slurry collection system 402 or any other valves, pumps or pressure, temperature or flow related devices.

Figure 10A:
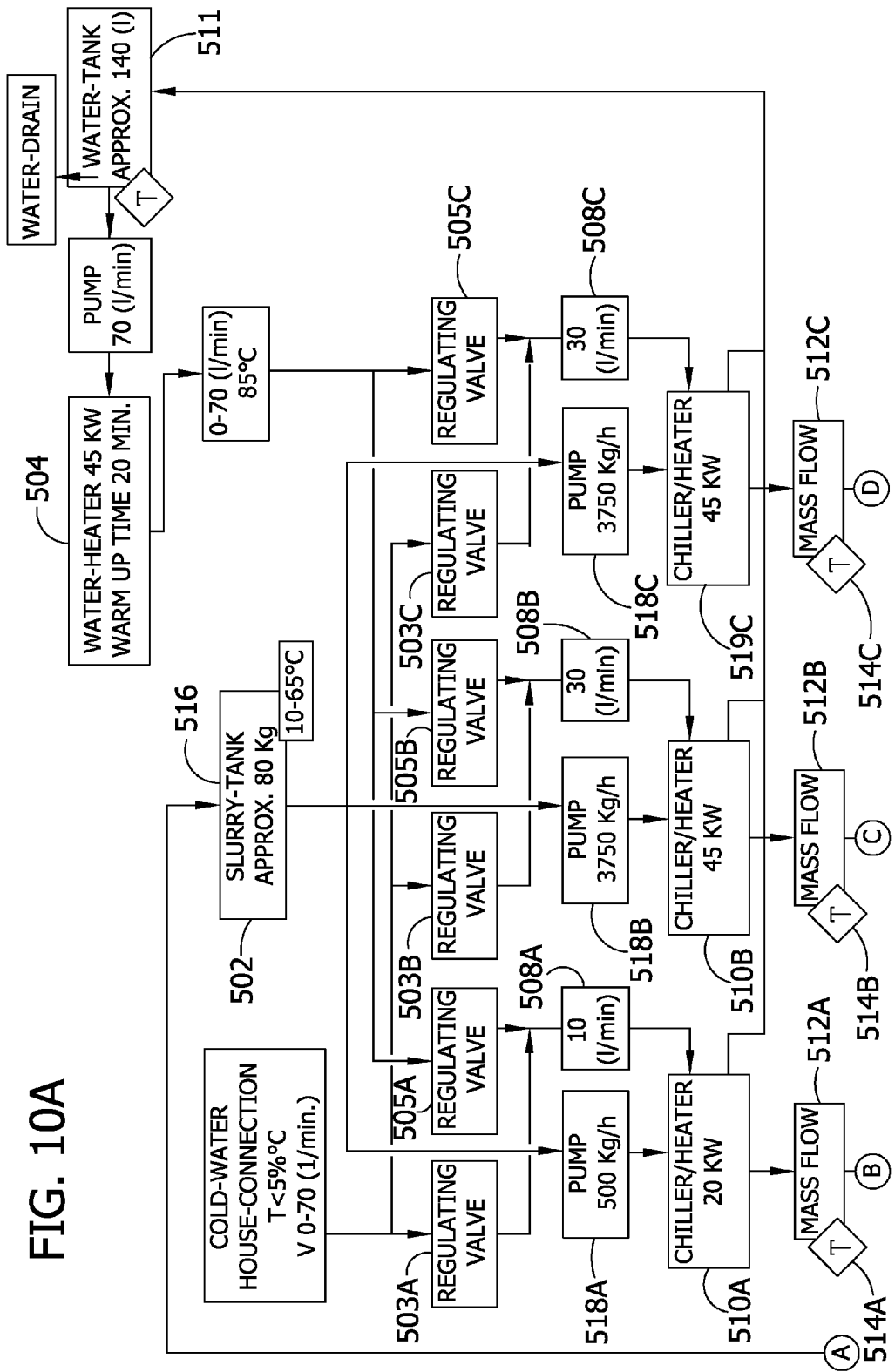
FIGS. 10A and 10B are a block diagram illustrating another embodiment of a system according to the invention.
Figure 10B:
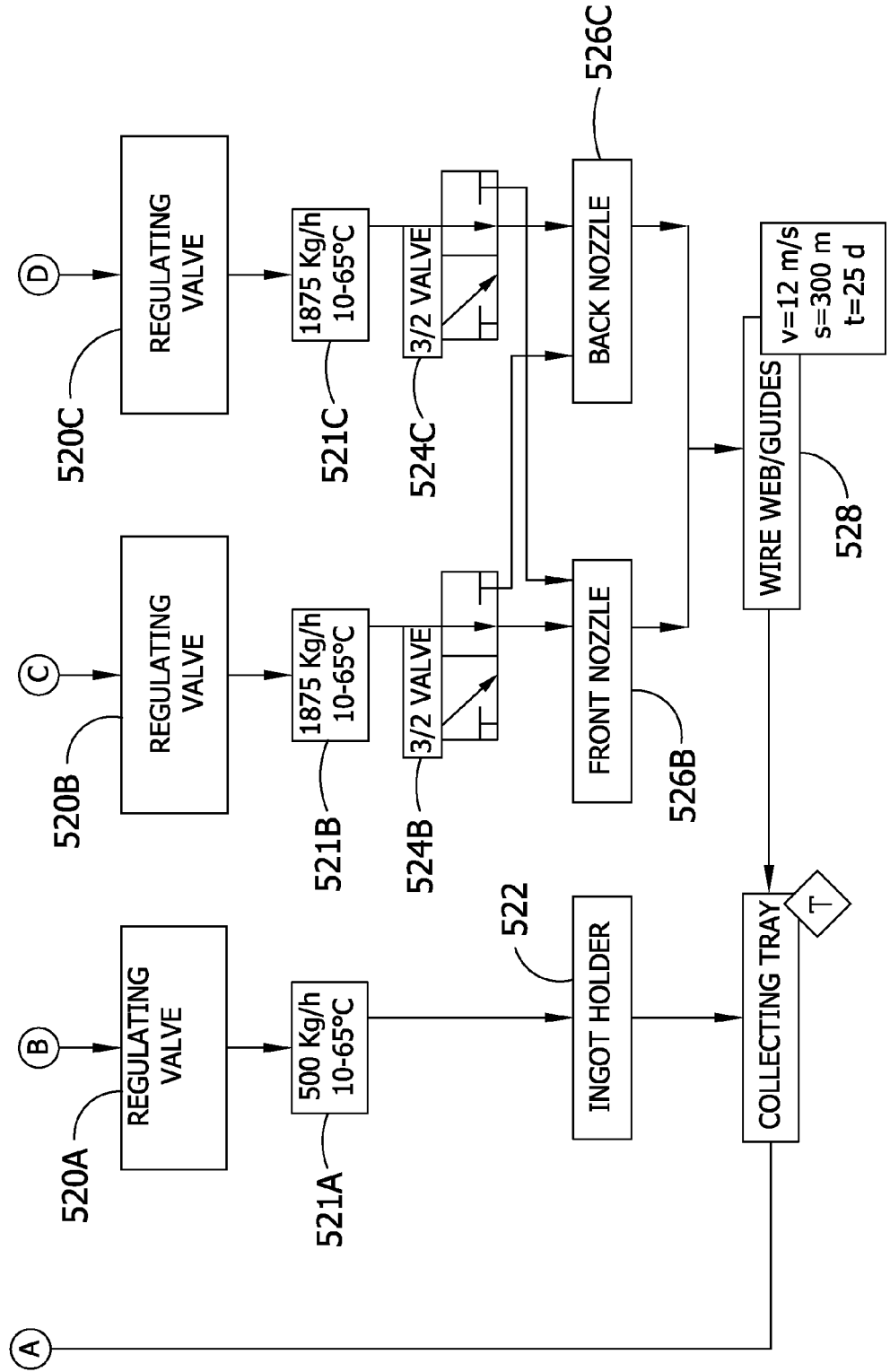

FIGS. 10A and 10B illustrate an embodiment of the system of the invention. In this embodiment, a cold water source, such as a cold water house connection 502, supplies cold water via regulating valves 503 controlled manually or by a control system, such as a computer (not shown in FIGS. 10A and 10B). In this embodiment, a hot water source, such as a water heater 504, supplies hot water via regulating valves 505 controlled manually or by the aforementioned control system. The hot and cold water streams are mixed and provided at maximum flow rates 508 (e.g., 10 or 30 l/min) to various sized chiller/heaters 510, the flow rate being dependent upon the capacity of the chiller/heaters and the process requirements. The output water from the chiller/heaters 510 is collected in a water tank 511 and at least part of it is pumped and recycled through the water heater 504.

A slurry tank 516 which stores the collected slurry supplies slurry to the chiller/heaters via pumps 518 sized to match the respective chiller/heater capacities. The output slurry passing through each chiller/heater 510 is provided to a mass flow controller 512 which controls its flow rate. A temperature sensor 514 provides temperature information to the control system for controlling the slurry temperature by manipulating the flow-rates of the water streams and/or the heater/chiller power settings.

The output slurry flow rate from the mass flow controllers 512 is further controlled by regulating valves 520 with maximum flow rates 521 (e.g., 500 Kg/h and 1875 Kg/h in the temperature range of 10-65° C.). One of channels (e.g., channel A) of slurry output is provided to the ingot holder 522. Two of the channels (e.g., channels B and C) are intermixed via 3/2 valves 524 and recycling nozzles 526 and then provided to the wire web 528 operating at a predetermined rate (e.g., "v=12 m/s" is an example of the velocity with which the wire reciprocates; "s=300 m" is an example of the distance the wire web travels in one forward motion; and "t=25 s" is an example of the time it takes to travel distance "s" at a velocity "v").

Figure 11:
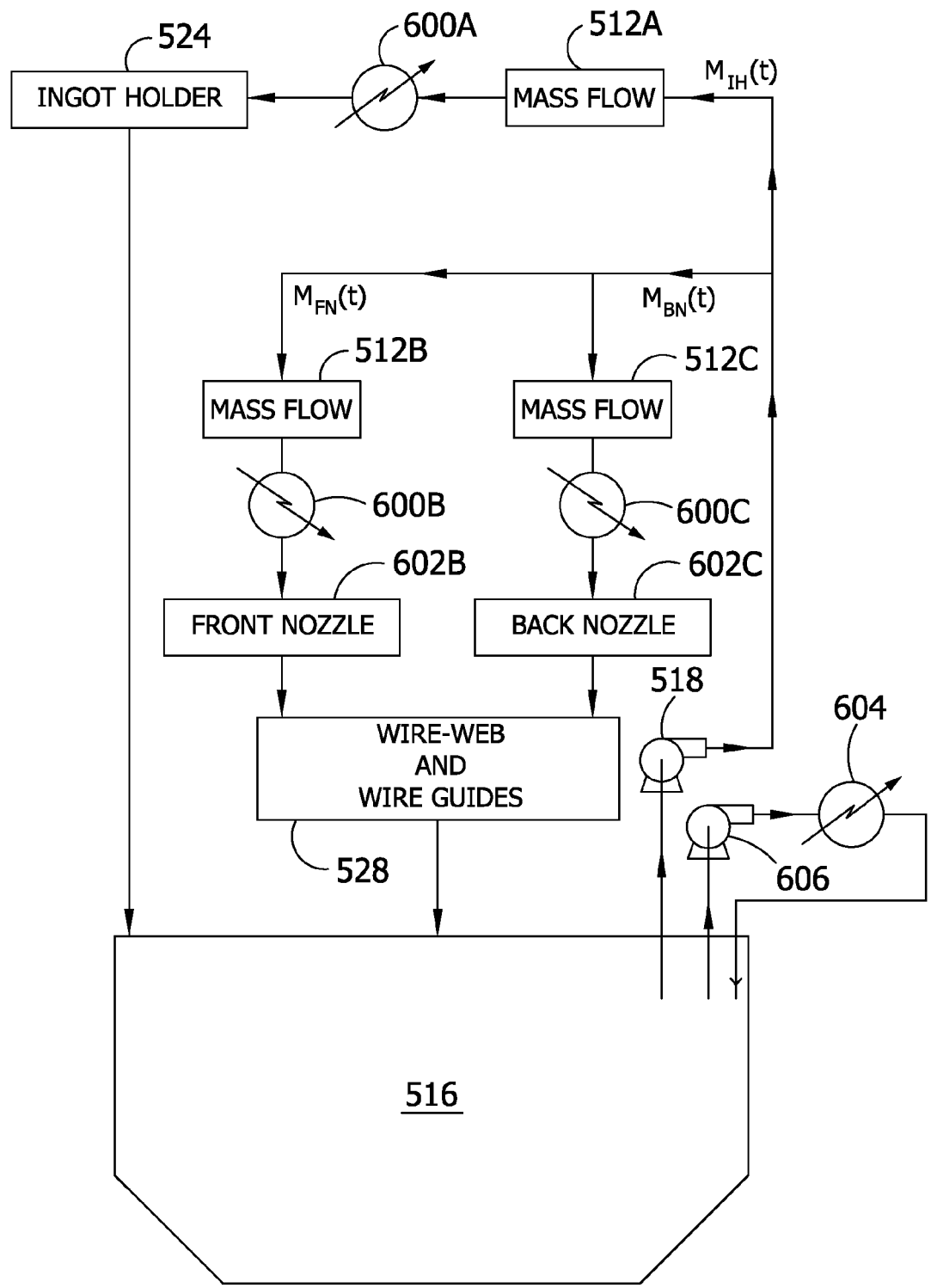
FIG. 11 is a block diagram illustrating another embodiment of a system according to the invention.

Referring to FIG. 11, another embodiment is illustrated wherein a heater 600A and a mass flow controller 512A control slurry temperature and flow rate being delivered to the ingot holder 522. In addition, a heater 600B and a mass flow controller 512B control slurry temperature and flow rate being delivered to a front nozzle 602B of the wire web and wire guides 528. In addition, a heater 600C and a mass flow controller 512C control slurry temperature and flow rate being delivered to a back nozzle 602C of the wire web and wire guides 528. Also, an additional chiller or heater or both, 604 is provided to cool or heat slurry in the slurry tank 516 which is circulated by a pump 606. As an example of operation, heater 600A is "on" if the temperature of the total mass flow $M_{Total}$ (t) ($M_{Total}$ (t)=$M_{FN}$ (t) $M_{BN}$ (t) $M_{IH}$ (t)) of the slurry is less than the desired temperature for the ingot holder. During the forward motion of the wire, heater 600B is "on" to provide slurry via the front nozzle 602B at the desired preset temperature. If the temperature of $M_{Total}$ (t) is less than the room temperature, then the heater 600C is "on" to heat the slurry to room temperature. Otherwise, heater 600B is "off." During backward motion of wire, heater 600C is "on" to provide slurry via the back nozzle 602C at the desired preset temperature. If temperature $M_{Total}$ (t) is less than room temperature, the heater 600C is "on" to heat the slurry to room temperature. Otherwise, heater 600C is "off." This example eliminates the need to have shut-off valves. In addition, this example helps keep the wire guides at room temperature. Preferably, the flow rate through the nozzles 602B and 602C is the same ($M_{FN}$(t)=$M_{BN}$(t) for all times "t").

In one embodiment, it is contemplated that the pump 606 may be used in combination with a mass flow controller (not shown) to maintain the slurry at room temperature in the preheating stage (e.g., 25° C.) and/or to cool the slurry from 25° C. to the lowest possible temperature (e.g., 10° C. using plant-water and with software modifications) during the cutting cycle as per the imposed slurry temperature profile.

The numbers noted above are exemplary of typical numbers but can vary depending on the process situation and requirements.

Those skilled in the art will recognize that there are other embodiments within the scope of the above, such as mixing the hot and cold slurry, instead of or in addition to mixing the hot and cold water, to get the right slurry temperature. Alternatively, and in addition, one single slurry tank at an average temperature between 10 and 65° C. may be used, or two separate slurry tanks, one at a higher temperature and one at a lower temperature, may be used.

Thus, FIGS. 10A, 10B and 11 illustrate a system for cutting an ingot comprising a slurry collection system (a collecting tray and slurry tank 516) for collecting and supplying slurry. A slurry handling system (e.g., such as pumps 518) is connected to the slurry collection system for controlling temperature and flow rate of the slurry. A first output port from channel A provides slurry at a first temperature and a first flow rate to the ingot holder 522. A second output port from channel B provides slurry at a second temperature and a second flow rate to nozzle 526B, 602B. A third output port from channel C provides slurry at a third temperature and a third flow rate to nozzle 526C, 602C.

Optionally, the slurry handling system may include a plurality of chiller/heaters 510 and mass flow controllers 512 for controlling the temperature and flow rate of the slurry.

Alternatively and in addition, a hot water source 504 and a cold water source 502 supply hot and cold water to the chiller/heaters 510.

The above examples further illustrate embodiments of the invention. Having described the invention in detail, it will be apparent that modifications and variations are possible without departing from the scope of the invention defined in the appended claims.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

In view of the above, it will be seen that the several objects of the invention are achieved by one or more embodiments and other advantageous results attained.

What is claimed is:

1. A system for cutting an ingot, said system comprising:
a slurry;
a cooling system for cooling the slurry;
a heating system for heating the slurry; and
a wire saw ingot slicing system including at least one cutting wire for cutting the ingot and an ingot-holder for holding the ingot, the wire saw ingot slicing system also including:
an ingot-holder port for receiving a first mixture of the heated slurry and the cooled slurry and for applying the first mixture to the ingot-holder; and
a wire-web port for receiving a second mixture of the heated slurry and the cooled slurry and for applying the second mixture to the at least one cutting wire.

2. A system for cutting an ingot, said system comprising:
a slurry collection system for collecting and supplying slurry;
a slurry handling system connected to the slurry collection system for controlling temperature and/or flow rate of the slurry and having a first output port providing slurry at a first temperature and/or a first flow rate and having a second output port providing slurry at a second temperature and/or a second flow rate, wherein the second temperature is different than the first temperature and/or the second flow rate is different than the first flow rate; and
a wire saw ingot slicing system having at least one cutting wire for cutting the ingot, the wire saw ingot slicing system having a first port for receiving slurry from the first output port and applying the slurry received from the first output port to the wire saw ingot slicing system at a first location and having a second port for receiving slurry from the second output port and applying the slurry received from the second output port to the wire saw ingot slicing system at a second location, and wherein the slurry handling system provides slurry to at least one of the first output port and the second output port at a slurry temperature and/or a slurry flow rate varied in proportion to a location of the at least one cutting wire relative to the ingot.

3. The system of claim 2 further comprising a controller for controlling the slurry handling system and thereby controlling at least one of: the first temperature of the slurry at the first output port, the second temperature of the slurry at the second output port, the first flow rate of the slurry at the first output port, and the second flow rate of the slurry at the second output port.

4. The system of claim 2 wherein the first port of the wire saw ingot slicing system comprises an ingot-holder port for receiving slurry from the first output port and wherein the second port of the wire saw ingot slicing system comprises a wire-web port for receiving slurry from the second output port.

5. The system of claim 4 wherein the slurry handling system provides slurry at a flow rate in the range of about 3 or more liters/minute to the ingot-holder port.

6. The system of claim 4 wherein the wire-web port receives slurry and applies the received slurry to at least one wire of the wire saw ingot slicing system before the ingot is cut to preheat the at least one wire.

7. The system of claim 6 wherein the slurry supplied to the wire saw ingot slicing system is preheated to a temperature of approximately 65 degrees centigrade.

8. The system of claim 2 wherein the slurry handling system provides slurry at a slurry flow rate varied in direct proportion to the location of the at least one cutting wire relative to the ingot.

9. The system of claim 2 wherein the slurry handling system provides slurry at a slurry temperature varied in inverse proportion to the location of the at least one cutting wire relative to the ingot.

10. The system of claim 2 further comprising an ingot heating system for preheating the ingot to a preset temperature before cutting.

11. The system of claim 10 wherein the ingot is preheated to a temperature of approximately 55 degrees centigrade.

12. A method for cutting an ingot comprising:
collecting and supplying slurry;
controlling temperature and/or flow rate of the slurry and providing slurry to a first port of a wire saw ingot slicing system at a first temperature and/or a first flow rate, and to a second port of the wire saw ingot slicing system at a second temperature and/or a second flow rate, wherein the second temperature is different than the first temperature and/or the second flow rate is different than the first flow rate; and cutting the ingot with the wire saw ingot slicing system while supplying the slurry to the wire saw ingot slicing system, the controlled temperature and/or controlled flow rate of the slurry varied in proportion to a location of a cutting wire of the wire saw ingot slicing system relative to the ingot.

13. The method of claim 12 wherein the controlled temperature and/or controlled flow rate of the slurry is varied in proportion to a location of a cutting wire of the wire saw ingot slicing system relative to the ingot.

14. A system for cutting an ingot, said system comprising:
a slurry;
a slurry temperature control system for controlling a temperature of the slurry;
an ingot heating system for heating the ingot during cutting of the ingot; and
a wire saw ingot slicing system including at least one wire for cutting the ingot, the wire saw ingot slicing system having a first port for receiving the slurry at a first temperature and applying the received slurry to the ingot and a second port for receiving the slurry at a second temperature and applying the received slurry to the at least one wire as the ingot is cut by the at least one wire, wherein the second temperature is different than the first temperature.

15. The system of claim 13 further comprising a controller for controlling the slurry temperature control system and the ingot heating system and thereby controlling at least one of: the temperature of the slurry and the temperature of the ingot.

16. A method for cutting an ingot, said method comprising:
collecting and supplying a slurry;
controlling delivery of the slurry and providing slurry to a first port of a wire saw ingot slicing system at a first temperature and/or a first flow rate, and to a second port of the wire saw ingot slicing system at a second temperature and/or a second flow rate, wherein the second temperature is different than the first temperature and/or the second flow rate is different than the first flow rate;
preheating the ingot to a preset temperature prior to cutting the ingot;
applying the slurry to a wire saw slicing system to preheat the wire saw slicing system prior to cutting the ingot; and
cutting the ingot with the wire saw ingot slicing system while supplying the slurry to the wire saw ingot slicing system.

17. The method of claim 16 wherein the ingot is preheated to a temperature of approximately 55° C. and a temperature of the slurry applied to the wire saw ingot slicing system to preheat the wire saw ingot slicing system is approximately 65° C.

* * * * *